Oct. 10, 1967  JAMES E. WEBB  3,346,419
ADMINISTRATOR OF THE NATIONAL AERONAUTICS
AND SPACE ADMINISTRATION
SOLAR CELL MOUNTING
Filed Nov. 29, 1963
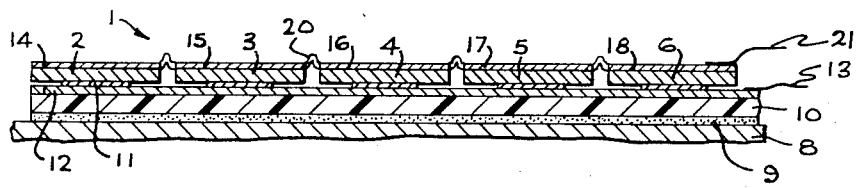
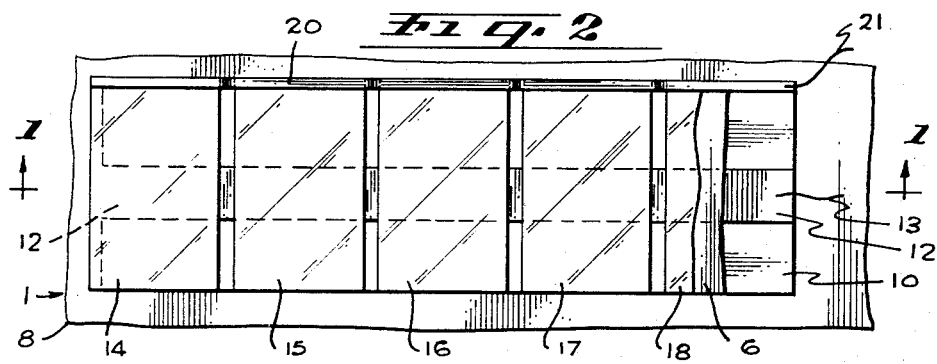
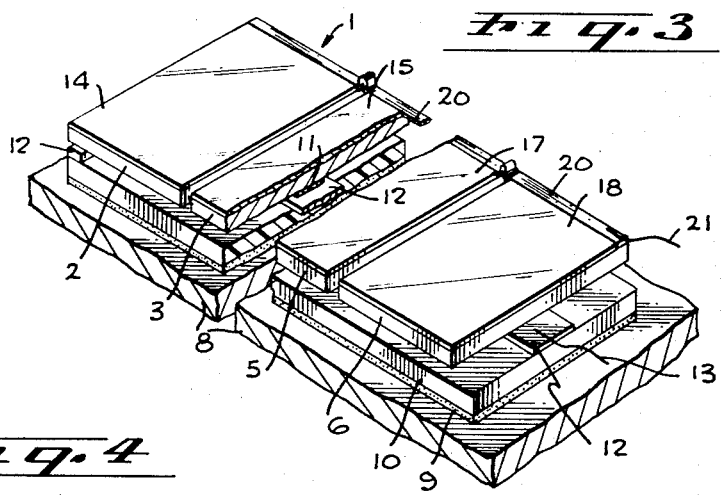
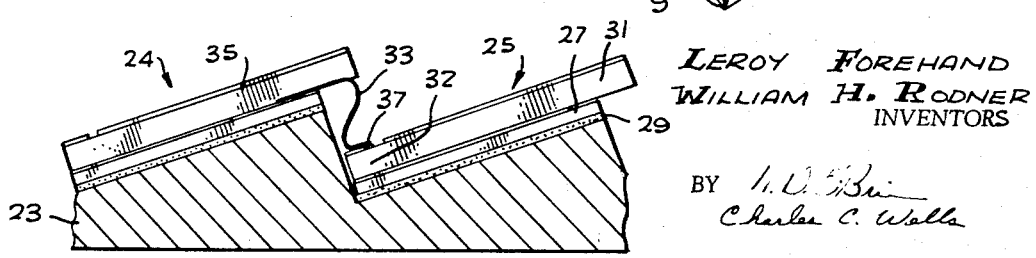
LEROY FOREHAND
WILLIAM H. RODNER
INVENTORS
BY
ATTORNEYS United States Patent Office 3,346,419
Patented Oct. 10, 1967

3,346,419
SOLAR CELL MOUNTING
James E. Webb, Administrator of the National Aeronautics and Space Administration, with respect to an invention of Le Roy Forehand, Gardena, and William H. Rodner, Hawthorne, Calif.
Filed Nov. 29, 1963, Ser. No. 327,163
1 Claim. (Cl. 136—89)

The present invention relates generally to solar batteries wherein a plurality of voltaic cells or, as they are more commonly termed and hereafter referred to, solar cells, have been connected to form a solar battery having desired voltage and current characteristics. More particularly this invention relates to the fabrication of a bank of solar cells employing a new and novel means for attaching the solar cells to a base member or substrate.

The theory and operation of solar batteries is well known and such batteries are in extensive use as a direct source of voltage as well as a voltage source for charging storage batteries. A solar battery is usually constructed by positioning a plurality of solar cells adjacent one another in slightly spaced relation and electrically interconnecting the solar cells to form a bank of solar cells. Several of these banks can be connected in series and parallel arrangements to form a battery having desired voltage and current characteristics. The fact that solar batteries are light in weight and enjoy long life and trouble free operation makes them particularly desirable in missile and satellite applications wherein weight restrictions and reliability requirements prohibit the use of more conventional sources of voltage. Solar batteries can also be used as a power supply for portable radios, televisions, and, as their cost becomes less prohibitive, a source of electricity for home use.

In the past the customary and usual method of fabricating solar batteries has been to attach a desired number of solar cells directly to a substrate or base by means of a suitable adhesive such as an epoxy resin. The adhesives used are generally of a type which remain pliable at moderately low temperatures but become stiff and brittle when exposed to extremely low temperatures. When extremely low temperatures are encountered the effects of the difference in coefficients of expansion of the substrate and solar cell become important in that stresses are set up that result in fracture of the solar cell. In other words, when low temperatures are encountered, the contraction of the base exceeds that of the solar cell and, since the adhesive has become brittle and unyielding, there is nothing to compensate for the difference in contraction and forces are exerted on the solar cell which result in the fracture thereof. Inasmuch as solar batteries utilized in satellite and other space applications will be exposed to the temperature extremes present in a space environment it is quite important that this cell fracture be prevented in order to assure continued and reliable operation of such batteries.

The fabrication of conventional solar batteries is made more difficult by the fact that the solar cell must be attached in a position wherein it is slightly spaced from the base so that there is no electrical connection therebetween. This positioning is difficult to obtain and/or maintain when the solar cell is secured directly to the base by an adhesive. Another problem or difficulty encountered in fabricating conventional solar batteries is the wiring operation that is required on each individual solar cell in order to connect them in a desired parallel or series arrangement. The individual solar cells are very small and thus this wiring operation, which is normally done by hand, is tedious and time consuming and increases the difficulty of fabrication.

The present invention eliminates these problem areas existing in conventional solar batteries. Briefly, this is accomplished by interposing an electrically nonconducting board member between the solar cell and the base on which the solar cell is mounted. The board member has conductor strips on the side thereof to which the solar cells are to be attached and the other side of the board member is attached to the base by means of a suitable adhesive. This type of construction results in a sandwich structure wherein the stresses generated because of the differences in coefficients of expansion of the solar cells and base are relieved and fracture of the solar cell is prevented. A further advantage of the present invention lies in the fact that the conductor strips eliminates the necessity for wiring on the back sides of the solar cell and thus eliminates a time consuming and expensive hand wiring operation. In addition, the presence of the electrically nonconducting board member effectively insulates the solar cells from the base.

The foregoing and other features and advantages of the invention will be more readily understood by considering the following detailed description, with reference to the accompanying drawing wherein:

FIG. 1 is a side elevation illustrating in cross section, one cell bank of a solar battery wherein a plurality of solar cells are attached to a base.

FIG. 2 is a plan view of the bank of solar cells shown in FIG. 1 with one of the solar cells broken away to more clearly show the details of construction.

FIG. 3 is an isometric view of the bank of solar cells illustrated in FIGS. 1 and 2 with portions of the solar bank broken away to more clearly illustrate the construction details thereof.

FIG. 4 is a side elevation illustrating an arrangement of solar cells wherein the solar cells are attached in a shingled arrangement.

Referring to the drawings, FIG. 1 is a cross-sectional view of a bank of solar cells 1 wherein a plurality of solar cells 2–6 are mounted on a base or substrate 8. The solar cells are of a well known type and each is comprised of a flat wafer of a suitable semiconductor material cut from a crystal of semiconductor material such as silicon. Base 8 is a thin plate that supports the solar cells and provide a means for attaching the bank of solar cells to any desired structure or object. In order that base 8 may be mounted on a desired structure, such as for example a missile or satellite, the base is provided with brackets or some other mounting means (not shown) for attachment purposes. Base 8 is normally composed of a lightweight metal such as aluminum, beryllium or magnesium, however, it can be composed of any suitable material. An electrically nonconducting board member 10 is interposed between the solar cells and base, and board member 10 is attached directly to base 8 by means of a suitable adhesive 9 which remains pliable and yielding at low temperatures. Board member 10, which electrically insulates the solar cells from the base, is preferably made of epoxy glass, however, it can be composed of any suitable dielectric material. The upper surface of the board member has a conductor strip 12 bonded thereto for electrically connecting each of the solar cells in the bank. The conductor strip is usually composed of copper, but it can be of any other suitable conductor material. The lower surface of each of the solar cells is provided with a metallic coating such as nickel, silver or platinum (not shown), applied by electroplating or some other suitable process. The coated lower surface is tinned by dipping in a solder bath to prepare the lower surface of the cell so that it can be soldered to the conductor strip. The lower surface of a solar cell is the negative terminal thereof and in order that a cell be electrically connected to an adjacent cell it is necessary that such a conductive coating be provided on the lower surface of each cell for attaching electrical connections thereto. However, in the present invention no wiring is necessary on the bottom of the cells since the lower surface of each cell is soldered directly, as indicated at 11, to the copper strip. The upper surfaces of solar cells 2–6 are the positive terminals thereof and these surfaces are provided with coatings 14–18 of tinted glass which acts as a filter to filter out infra-red and ultra-violet light. The presence of infra-red and ultra-violet light lowers the operating efficiency of a solar cell and thus reduces the output thereof. Therefore, in order to obtain maximum efficiency and output from a solar cell it is desirable to eliminate as much infra-red and ultra-violet light as possible. The upper surfaces of the solar cells, shown in FIGS. 2 and 3, have a connector strip 20 provided on the edges thereof which electrically connects the positive terminals of each of the five solar cells. The conductor strip is attached by soldering so it is necessary that the edges of the solar cells be prepared for soldering by plating and tinning. Conductor strip 12 and connector strip 20 can be electrically connected, respectively, to adjacent banks of solar cells (not shown) by connecting wires 13 and 21.

The thicknesses of the various components of each solar bank has been considerably exaggerated for ease of illustration and it should be understood that the solar cells are thin, fragile devices subject to fracture when stressed. Cell fracture at low temperatures becomes a serious problem in conventional methods of fabricating solar batteries in which the solar cell is attached directly to the base or substrate by an epoxy resin or other adhesive. Cell fracture at low temperatures is caused by the relatively greater amount of contraction of the base as compared to the solar cell. Metals, aluminum for example, have a larger coefficient of expansion than silicon and thus expand and contract more in response to temperature variations. In attaching the solar cells to the base it has been the practice to employ an adhesive having a coefficient of expansion intermediate that of the base and solar cells to reduce the stress applied to the solar cell. This practice alleviates the cell fracture problem to some extent; however, cell fracture still results at very low ambient temperatures due to the increased contraction of the base and the stiffness of the adhesive.

In the present invention the stresses which would normally be applied to the cell are applied to the epoxy glass board member and these stresses are not transferred to the solar cell, since the solar cell is bonded to the board member only by a relatively small solder connection. It can be seen in FIGS. 1 and 3 that the area of each of the solder connections between the solar cells and conductor strip 12 is relatively small when compared to the solar cells.

FIG. 4 is an end view that illustrates an arrangement of solar cells which is similar to that shown in FIGS. 1 and 3 except that the base or substrate 23 is of stepped construction and the banks of solar cells 24 and 25 are attached to the substrate in a shingled arrangement. The embodiment shown in FIG. 4 is similar to that shown in FIGS. 1 through 3 in that an electrically nonconducting board member 27 is attached to the substrate by an adhesive 29. However, in this embodiment, the solar cell 31 is attached directly to the nonconducting board member by means of an adhesive and the electrical connection between the adjacent cell banks is made by means of connecting wire 33 which is attached at one end to the lower surface of solar cell 35 and at the other end to connector strip 37 on cell bank 25. Cell banks 24 and 25 would each be composed of several cells electrically connected together by suitable wiring means (not shown) rather than a conductor strip.

While particular embodiments of this invention have been shown and described, it will be obvious to those skilled in the art that changes and modifications may be made without departing from this invention, therefore, the scope of this invention is defined and limited only by the appended claim.

What is claimed is:

In a solar battery, the combination comprising:
(a) a metal base member,
(b) a plurality of solar cells having conductive upper and lower surfaces,
(c) a rigid non-conducting glass type board member,
(d) adhesive means to attach the lower surface of said board member to said base member,
(e) a conducting strip having a lower surface attached directly to the upper surface of said board member and an upper surface connected directly to said lower conductive surfaces of said solar cells,
(f) said nonconducting board member electrically insulating said solar cells from said base member, said board member's lower surface having a coefficient of expansion that cooperates with said adhesive means so as to relieve the effect of differences in coefficients of expansion between them, and
(g) connector means to electrically connect the upper surfaces of said solar cells.

References Cited

UNITED STATES PATENTS

| | | | |
|---|---|---|---|
| 3,255,047 | 6/1966 | Escoffery | 136—89 |
| 3,268,366 | 8/1966 | Guyot | 136—89 |
| 2,428,537 | 10/1947 | Veszi et al. | 136—89 |
| 2,983,887 | 5/1961 | Wormser | 136—89 X |
| 2,989,575 | 6/1961 | Wallace | 136—89 |
| 3,005,862 | 10/1961 | Escoffery | 136—89 |
| 3,116,171 | 12/1963 | Nielsen et al. | 136—89 |
| 3,151,379 | 10/1964 | Escoffery | 136—89 |

FOREIGN PATENTS 655,927    1/1938    Germany.

OTHER REFERENCES

Crawford, W. L. et al.: "Pluggable Solar Cell," in "IBM Technical Disclosure Bulletin," volume 4, No. 11, April 1962, page 62.

WINSTON A. DOUGLAS, *Primary Examiner.*

A. M. BEKELMAN, *Assistant Examiner.*